United States Patent
Kim et al.

(10) Patent No.: US 8,527,018 B2
(45) Date of Patent: Sep. 3, 2013

(54) METHOD AND APPARATUS FOR REDUCING POWER CONSUMPTION IN MOBILE TERMINAL

(75) Inventors: Ki-Soo Kim, Gyeonggi-do (KR); Dong-Hoon Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 614 days.

(21) Appl. No.: 12/765,960

(22) Filed: Apr. 23, 2010

(65) Prior Publication Data
US 2010/0271176 A1    Oct. 28, 2010

(30) Foreign Application Priority Data
Apr. 28, 2009   (KR) .................. 10-2009-0037020

(51) Int. Cl.
*H04Q 1/30* (2006.01)

(52) U.S. Cl.
USPC ............................... 455/574; 455/458

(58) Field of Classification Search
USPC ............. 455/574, 458, 550.1; 370/311, 338, 370/392
See application file for complete search history.

(56) References Cited

U.S. PATENT DOCUMENTS
2008/0076452 A1 *   3/2008   Willey ................ 455/458

\* cited by examiner

*Primary Examiner* — Sam Bhattacharya
(74) *Attorney, Agent, or Firm* — Cha & Reiter, LLC (57) ABSTRACT

An apparatus and a method for reducing battery consumption of a mobile terminal are provided. More particularly, an apparatus and a method for reducing battery consumption by allowing a mobile terminal to perform a wakeup process by expiration or update of a timer which coincides with a paging period in order to reduce battery consumption. The controller reduces a frequency of waking up from a sleep mode by matching a wakeup time set by a timer to a paging period with a certain condition is met.

14 Claims, 5 Drawing Sheets

FIG.1
(CONVENTION ART)

METHOD AND APPARATUS FOR REDUCING POWER CONSUMPTION IN MOBILE TERMINAL

CLAIM OF PRIORITY

This application claims the benefit under 35 U.S.C. §119 (a) from a Korean patent application filed in the Korean Intellectual Property Office on "Apr. 28, 2009" and assigned Serial No. "10-2009-0037020", the entire disclosure of which is hereby incorporated by reference in its entirety.

BACKGROUND OF THE INVENTION

1. Field of the Invention

The present invention relates to an apparatus and a method for reducing battery consumption of a mobile terminal. More particularly, the present invention relates to an apparatus and a method for reducing battery consumption by allowing a mobile terminal to perform a wakeup by expiration or update of a timer at a wakeup time.

2. Description of the Related Art

Availability of a mobile terminal that can perform wireless voice communication and other information exchange becomes a necessity in modern life. At an early stage, a mobile terminal has been recognized as portable device that can perform wireless communication. As a technology develops and wireless Internet is introduced, a mobile terminal provides not only a basic function of telephone communication, but it now provides a wide range application, such as games, satellite broadcasting viewing, a remote function using short distance communication, image capturing using a mounted camera module, and schedule management, etc.

With a rapid development of a mobile terminal, a smaller battery is desired while adequate enough to support various function. This requires the capacity of the battery to be increased, and battery consumption needs to be reduced or controlled simultaneously.

Representative functions of a mobile terminal causing additional battery consumption include operations such as call reception, listening music, moving image viewing, a camera function, etc. In addition, battery consumption occurs even in an idle state for detecting a paging message received from a base station. More particularly, a mobile terminal reduces battery consumption by waking up at a page slot during paging of the mobile terminal and receiving Common Air Interface (CAI) messages. Further, a consumption waste occurs whenever the mobile terminal frequently wakes up from a sleep mode. For example, a mobile terminal wakes up from a sleep mode not only at a paging period, but also when a software timer (for example, a timer for measuring battery) expires or is updated, or when an external interrupt (for example, a user's key input, call reception, and the like.) occurs. As a result, a battery consumption waste occurs during these circumstances.

Figure 1:
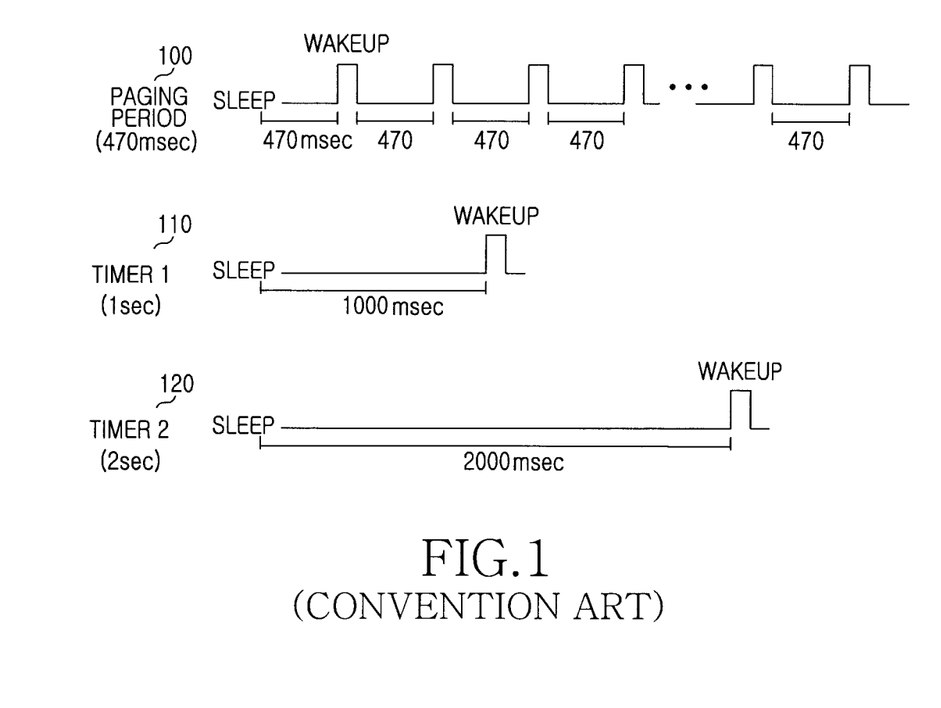
FIG. 1 is a view illustrating a wakeup circumstance causing battery consumption of the conventional mobile terminal.

FIG. 1 is a view illustrating typical wakeup modes that occur in a mobile terminal causing a battery consumption of the conventional mobile terminal.

For example, the mobile terminal may perform wakeup every paging period of 470 msec (100), and drives a software timer having periods of 1 second (110) and 2 seconds (120) subsequently. Hence, the mobile terminal performs wakeup every 470 msec (100) from a sleep mode. Further, when a timer 1 (110) expires or is updated in 1 second (1000 msec) and when a timer 2 (120) expires or is updated in 2 seconds (2000 msec), the mobile terminal performs the wakes up at a relevant point.

At this point, since the mobile terminal performs wakeup at a period of 470 msec (100), the mobile terminals performs wakeup for a paging period of 940 msec at a second wakeup point (that is, before 1 second, which is an expiration time of the timer 1 (110), expires), and then performs wakeup for the timer 1 (110) after a short time of 60 msec elapses.

In addition, the mobile terminal performs four times (1880 msec) of wakeups according to a paging period, and then performs wakeup for the timer 2 (120) after a short time of 120 msec elapses (2000 msec).

When the process of waking up from a sleep mode frequently occurs as shown in FIG. 1, the batter consumption of a mobile terminal increases.

Therefore, there is a need to reducing the battery consumption under the above circumstance.

SUMMARY OF THE INVENTION

An exemplary aspect of the present invention is to provide an apparatus and a method for reducing battery consumption of a mobile terminal.

Another exemplary aspect of the present invention is to provide an apparatus and a method for reducing battery consumption caused by frequent wakeup modes in a mobile terminal.

Still another exemplary aspect of the present invention is to provide an apparatus and a method for preventing frequent wakeup by allowing wakeup to be performed by a timer at a wakeup time that matches or coincides with a paging period of a mobile terminal if a certain condition is met.

Yet another exemplary aspect of the present invention is to provide an apparatus and a method for setting a wakeup time period by a timer that equals to a multiple duration of a paging period in a mobile terminal.

In accordance with an aspect of the present invention, an apparatus for reducing power consumption in a mobile terminal includes a controller for reducing a frequency of waking up from a sleep mode by setting a wakeup time to match to a duration that is equal to a number of paging periods when a certain condition is met.

In accordance with another aspect of the present invention, a method for reducing power consumption in a mobile terminal includes reducing a frequency of waking up from a sleep mode by matching a wakeup time that is equivalent of a multiple of a paging period when a certain condition is met.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description, with reference to the accompanying drawings, is provided to assist in a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. For the purposes of simplicity and clarity, descriptions of well-known functions and constructions may be omitted when their inclusion may obscure appreciation of the subject matter of the claimed invention by a person or ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

Figure 2:
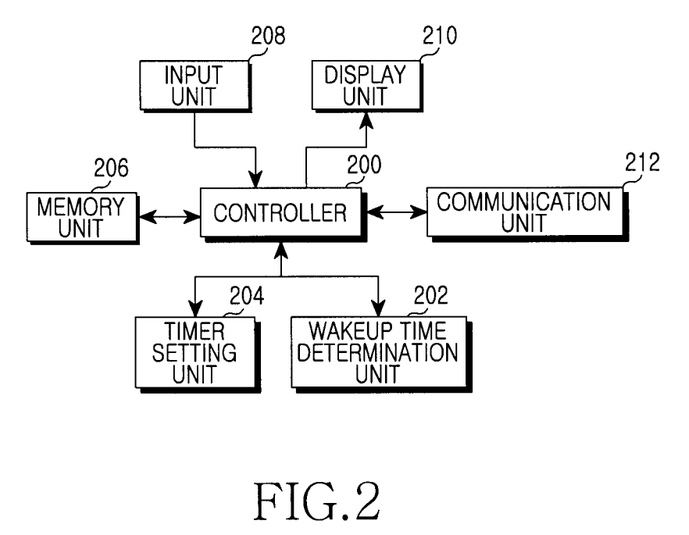
FIG. 2 is a block diagram illustrating a mobile terminal for reducing battery consumption occurring during a wakeup process according to an exemplary embodiment of the present invention.

FIG. 2 is a block diagram illustrating a mobile terminal for reducing battery consumption occurring during a wakeup process according to an exemplary embodiment of the present invention.

Referring to FIG. 2, the mobile terminal includes a controller 200, a wakeup time determination unit 202, a timer setting unit 204, a memory unit 206, an input unit 208, a display unit 210, and a communication unit 212.

The controller 200 of the mobile terminal controls an overall operation of the mobile terminal. For example, the controller 200 performs processes and controls for voice communication and data communication, and controls the wake up process to reduce battery consumption.

That is, the controller 200 reduces a frequency of wakeup by matching a paging period with a wakeup time by a timer. For example, the controller 200 allows the wakeup time determination unit 202 to determine a timer setting value to be set using a predetermined table. A detailed description relating to matching is explained later with reference to FIGS. 3 and 4.

Accordingly, the controller 200 allows the timer setting unit 204 to set a timer determined by the wakeup time determination unit 20 for generating a wakeup at a multiple of a paging period.

The wakeup time determination unit 202 determines a timer setting value using a predetermined table, that is, a difference between a timer period to be set and a paging period to see of a certain condition is met by comparing the difference to a predetermined threshold value. The timer setting value to perform the wake up would match or coincides with a multiple of a paging period so that wake up can occur simultaneously at the end of paging period or at the end of wake up time set by the timer. The determined timer setting value is forwarded to the controller 200. That is, the wakeup time determination unit 202 determines a wakeup time to be set by the timer. A detailed description relating to matching is explained later with reference to FIG. 4.

Thereafter, the timer setting unit 204 sets a timer for performing wakeup at a multiple of a paging period for setting the timer determined by the wakeup time determination unit 202.

The memory unit 206 includes Read Only Memory (ROM), Random Access Memory (RAM), a flash ROM, and the like. The ROM stores microcodes of processes and controls of the controller 200, the timer setting unit 204, and the wakeup time determination unit 202, and various reference data.

The RAM is a working memory of the controller 200, and stores temporary data generated during execution of various programs. In addition, the flash ROM stores various updatable data for storage such as a phone book, calling messages, reception messages, and information of a user's touch input point.

The input unit 208 includes a plurality of function keys such as numerical key buttons of 0 to 9, a menu button, a cancel (delete) button, an OK button, a TALK button, an END button, an Internet access button, navigation key (or direction key) buttons, letter input keys, and the like.

The display unit 210 displays status information generated during an operation of the mobile terminal, a limited number of letters, a large amount of moving images and still images, and the like. The display unit 210 may be a color Liquid Crystal Display (LCD), Active Mode Organic Light Emitting Diode (AMOLED), and the like. The display unit 210 may have a touch input device. When the display unit 210 having the touch input device is applied to a touch input type mobile terminal, the display unit 210 may serve as an input unit.

The communication unit 212 transmits/receives a Radio Frequency (RF) signal of data input/output via an antenna (not shown). For example, during transmission, the communication unit 212 channel-codes and spreads data to be transmitted, and then performs an RF process on the signal to transmit the signal. During reception, the communication unit 212 converts a received RF signal into a baseband signal, and despreads and channel-decodes the baseband signal to recover data.

The functions of the wakeup time determination unit 202 and the timer setting unit 204 may be performed by the controller 200 of the mobile terminal. In alternate embodiment, all of the functions of the wakeup time determination unit 202 and the timer setting unit 204 may be processed by the controller 200.

Hereinafter, a method for reducing battery consumption by performing the wakeup by a timer at a wakeup time using the above apparatus according to an exemplary embodiment will be described.

Figure 3:
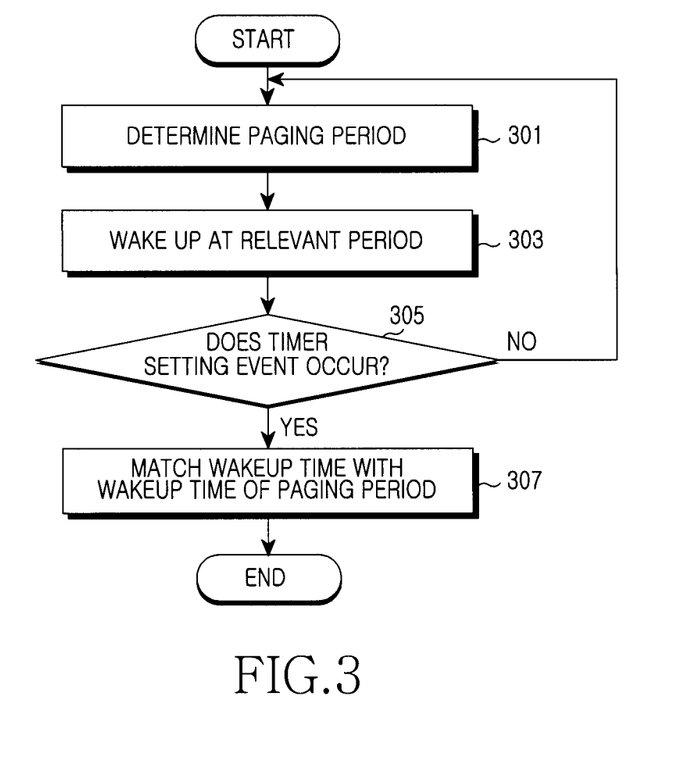
FIG. 3 is a flowchart illustrating an operation of a mobile terminal for reducing battery consumption occurring during a wakeup process according to an exemplary embodiment of the present invention.

FIG. 3 is a flowchart illustrating an operation of a mobile terminal for reducing battery consumption occurring during a wakeup process according to an exemplary embodiment of the present invention.

Referring to FIG. 3, the mobile terminal determines a page period by determining a Broadcast Control CHannel (BCCH) provided from a network in step 301, and wakes up from a sleep mode at every paging period in step 303.

The mobile terminal determines whether a timer setting event for setting a software timer (for example, a timer for determining the charging state of battery or other status of the mobile terminal) occurs in step 305.

When determining that the timer setting event does not occur in step 305, the mobile terminal re-performs a process of step 301.

In contrast, when determining that the timer setting event occurs in step 305, the mobile terminal reduces battery consumption by matching a wakeup time by expiration or update of the timer with a wakeup time duration of the paging period, thus reducing frequent wakeups in step 307. That is, the wake up time is set to coincide with the determined paging period of step 301.

After that, the mobile terminal ends the present algorithm.

Figure 4:
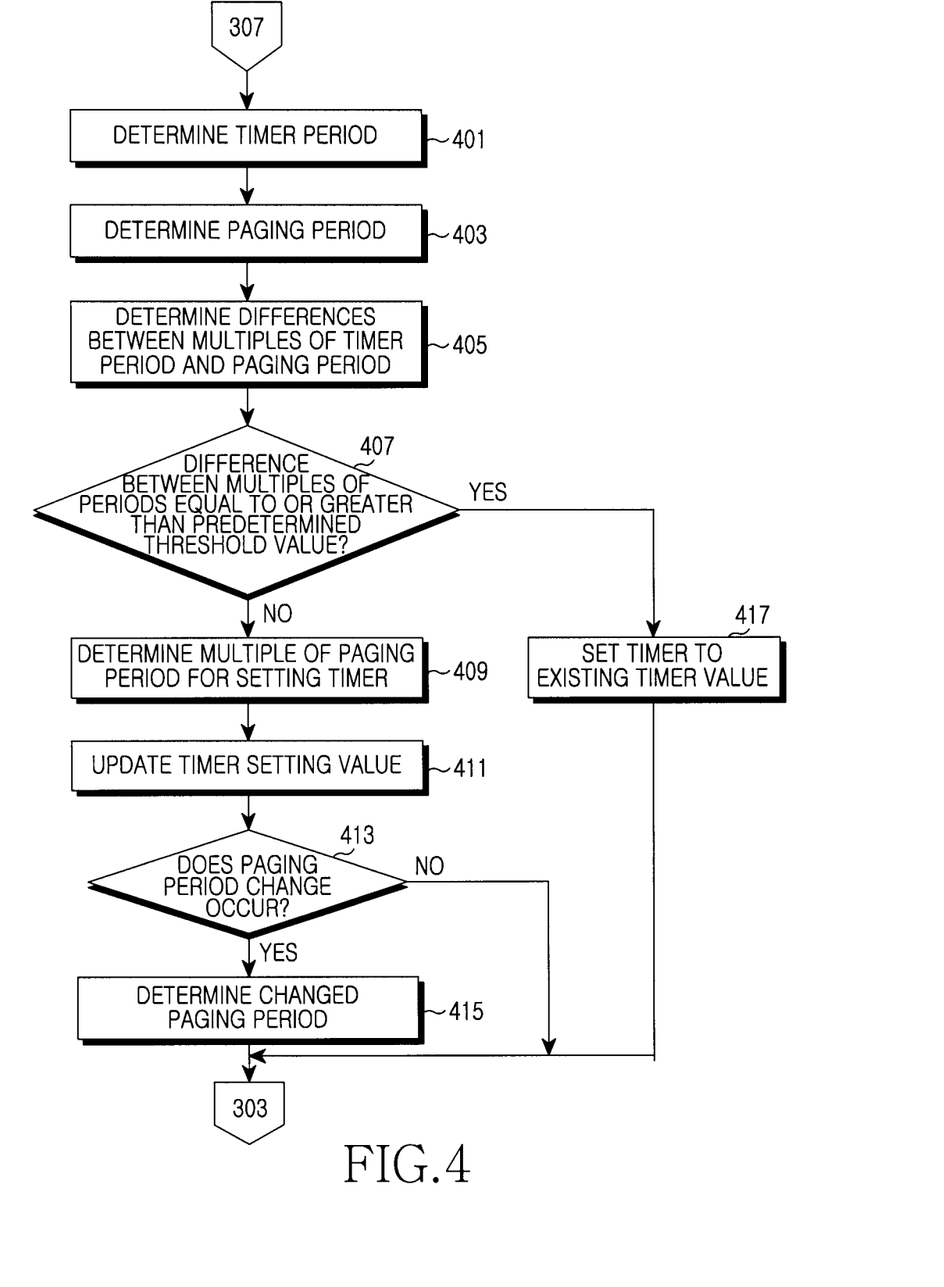
FIG. 4 is a flowchart illustrating an operation for reducing battery consumption occurring during a wakeup process in a mobile terminal according to an exemplary embodiment of the present invention.

FIG. 4 is a flowchart illustrating an operation for reducing battery consumption occurring during a wakeup process in a mobile terminal according to an exemplary embodiment of the present invention.

In FIG. 4, it is assumed that a timer setting event for setting a software timer has occurred in step 305 of FIG. 3.

The mobile terminal determines a timer setting value, that is, a timer period to be set in step 401, then determines a paging period in step 403.

The mobile terminal determines a multiple difference (Delta Offset and Delta) between a timer period and a paging period in step 405 using a predetermined table containing different timer period depending on the detected paging period. A detailed description of determining the multiple differences is explained hereinafter.

For example, the mobile terminal can determine a multiple difference (Delta Offset and Delta) using predetermined Table 1.

two values representing a difference between multiples of the timer period and the paging period denotes a difference between a wakeup time of a relevant multiple (m) and a wakeup time by a timer, and the former value (Delta Offset) denotes a difference between a wakeup time of the next multiple (m+1) of the relevant multiple and a wakeup time of a timer.

The mobile terminal determines whether the difference in the multiples (determined the Delta Offset in step 405) is equal to or greater than a predetermined threshold value in step 407. Here, the mobile terminal may compare a Delta Offset value of Table 1 with a predetermined threshold (for example, 500 msec) by a manufacturer. That is, the mobile terminal determines whether a normal operation can be performed when a wakeup time by a timer such as timer expiration or update coincides with a wakeup time dictated by a paging period by determining a difference in the multiples equal to or greater than the predetermined threshold value. By determining whether the difference in the multiples (Delta Offset value) is equal to or greater than the predetermined threshold value, the mobile terminal may determine a normal operation can be performed when a wakeup time by a timer such as timer expiration or update coincides with a wakeup time dictated by the paging period.

Thus, when determining the difference in the multiples (Delta Offset value) is equal to or greater than the predetermined size (that is, determining that a normal operation cannot be performed when a wakeup time set by a timer such as timer expiration or update coincides with a wakeup time dictated by the paging period) in step 407, the mobile terminal sets a timer using the timer period such as prior art in step 417.

In contrast, when determining the difference in the multiples (Delta Offset value) is less than the predetermined threshold value (that is, determining that a normal operation can be performed when a wakeup time set by a timer such as timer expiration or update coincides with a wakeup time set by the paging period) in step 407, the mobile terminal determines multiple time periods corresponding to the paging period from the predetermined table for setting a timer in step 409.

Here, the multiple of a paging period for setting a timer may be obtained by evaluating a quotient when a timer generation period of Table 1 is divided by a paging period.

The mobile terminal sets a timer corresponding to a multiple of the above determined paging period in step 411.

TABLE 1

| timer period(sec) | paging period(msec) | | | | | | | |
|---|---|---|---|---|---|---|---|---|
| | 2(470) | 3(706) | 4(941) | 5(1176) | 6(1412) | 7(1647) | 8(1882) | 9(2118) |
| | (Delta offset(msec), Delta(msec)) | | | | | | | |
| 2 | 120,120 | 118,588 | 118,118 | 352,120 | 588,588 | 353,353 | 118,118 | 118,118 |
| 5 | 170,300 | 58,58 | 295,295 | 296,824 | 648,764 | 59,59 | 646,1236 | 764,764 |
| 10 | 130,130 | 116,116 | 351,590 | 584,296 | 116,116 | 118,118 | 590,590 | 590,1528 |
| 30 | 80,390 | 348,348 | 112,829 | 576,592 | 348,348 | 354,354 | 112,1170 | 348,348 |
| 60 | 160,310 | 10,696 | 224,717 | 24,24 | 696,696 | 708,708 | 224,1658 | 696,696 |

Here, delta of Table 1 represents a difference between multiples of a timer period and a paging period. For example, generation of a 5 second-timer for determining the charging state of battery at paging 2 periods denotes that a difference between a 10-th wakeup time by a paging period and a wakeup time by the 5 second-timer is 300 msec (Delta), and that a 11-th wakeup time by a paging period and a wakeup time by the 5-second timer (software timer) is 170 msec (Delta Offset), for example. That is, the latter value (Delta) of For example, assuming that the mobile terminal generates a 5 second-timer for determining the charging state of battery at paging 2 periods, the mobile terminal may determine '10', which is a quotient obtained when '5000 msec (5 sec)', which is a timer setting period, is divided by '470 msec', which is a value of paging 2 periods, as a multiple of a paging period for setting the timer. At this point, since a difference between a 10-th wakeup time (4700 msec) of the paging period and a wakeup time by the timer (Delta value) is about 300 msec.

Also, a difference between a 11-th wakeup time (5170 msec) of the paging period and a wakeup time by the timer (Delta offset value) is about 170 msec, which is greater than the predetermined threshold value. Hence, the mobile terminal may determine that a normal operation of the timer can be performed.

That is, to prevent frequent wakeup, the mobile terminal may allows wakeup (that would occur twice otherwise) to occur only one time by generating a 5 second-timer that wakes up the mobile terminal at the 10-th wakeup of a paging period.

The mobile terminal determines whether a phenomenon of a paging period change occurs such as a handover in step 413.

When a phenomenon of a paging period change does not occur in step 413, the mobile terminal proceeds to a process of step 303 of FIG. 3 and processes to wake up at a relevant time.

In contrast, when a phenomenon of a paging period change occurs in step 413, the mobile terminal determines a changed paging period in step 415, then proceeds to step 303 of FIG. 3. After that, when a timer generation event occurs, the mobile terminal re-performs the process illustrated in FIG. 4.

Figure 5:
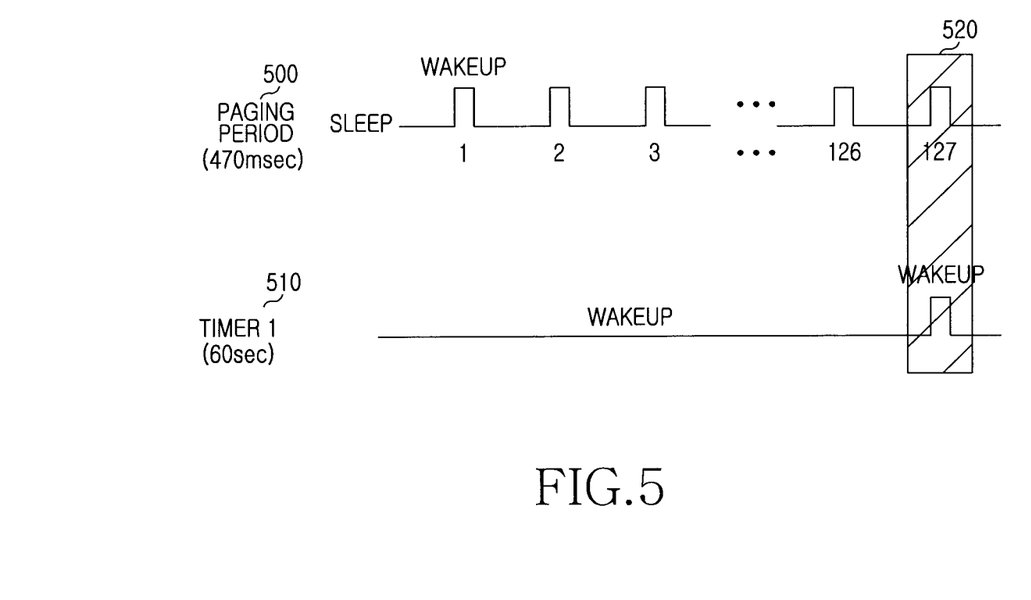
FIG. 5 is a flowchart illustrating a wakeup time of a timer generated by a mobile terminal according to an exemplary embodiment of the present invention.

FIG. 5 is a flowchart illustrating a wakeup time of a timer generated by a mobile terminal according to an exemplary embodiment of the present invention.

Referring to FIG. 5, the mobile terminal is schedule to wake up at a period of 470 msec (500), and the mobile terminal may generate a 60 second-timer (software timer) 510 to determine the charging state of battery, for example.

Then, the mobile terminal determines a multiple of a paging period for setting a timer by dividing a timer setting period by a paging period (for example, the mobile terminal obtains '127', which is a quotient obtained when '60000 msec (60 sec)' is divided by '470 msec', which is a value of a paging period).

Therefore, the mobile terminal may generate a timer that wakes up the mobile terminal at a 127-th wakeup time 520 (59690 msec) with a period of 470 msec. Here, it is assumed that the mobile terminal determines a difference between the multiples of a timer period and a paging period is less than a predetermined size with reference to Table 1. Accordingly, the mobile terminal may reduce battery consumption caused by frequent wakeup that occur different time than the paging period, thus reducing a wakeup frequency.

As described above, to reduce battery consumption generated while a mobile terminal wakes up, exemplary embodiments of the present invention allows wakeup by a timer to be performed at a wakeup time that coincides with a paging period, so that battery consumption caused by frequency wakeup from a sleep mode in the conventional mobile terminal is reduced. As a result, an operation time of the mobile terminal can be extended.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A mobile terminal, comprising:
   a timer, and
   a controller for controlling to reduce a frequency of waking up from a sleep mode by matching a wake up time set by the timer according to a multiple of a paging period of the mobile terminal,
   wherein the wake up time set by the timer and a wake up time set by paging period is different during a predetermined interval.

2. The mobile terminal of claim 1, wherein the controller comprises:
   a wakeup time determination unit for determining a duration of the wakeup time that is a multiple of the paging period; and
   a timer setting unit for setting the timer that allows wakeup to be performed at the multiple of the paging period determined by the wakeup time determination unit.

3. The mobile terminal of claim 2, wherein the timer is set when a difference between multiples of a timer period and the paging period is less than a predetermined threshold value.

4. The mobile terminal of claim 2, wherein the wakeup time determination unit determines a quotient obtained by dividing the timer period by the paging period to determine whether to set the timer.

5. The mobile terminal of claim 4, wherein the wakeup time determination unit determines whether to set the timer based on a predetermined data.

6. A method for reducing power consumption in a mobile terminal, the method comprising
   controlling to reduce a wake up time defined by a timer of the mobile terminal according to a multiple of a paging period of the mobile terminal,
   wherein the wake up time indicates a time which the mobile terminal wakes up from a sleep mode, and
   wherein the wake up time set by the timer and a wake up time set by paging period is different during a predetermined interval.

7. The method of claim 6, wherein the matching of the wakeup time comprises:
   determining a multiple of the paging period to be set as the wakeup time by the timer; and
   setting the timer that allows wakeup to be performed at the determined multiple of the paging period.

8. The method of claim 7, wherein the matching of the wakeup time is performed when a difference between multiples of a timer period and the paging period is less than a predetermined threshold value.

9. The method of claim 7, wherein the multiple of the paging period to be set as the wakeup time set by the timer is determined by dividing a timer period by the paging period.

10. The method of claim 9, wherein the multiple of the paging period to be set as the wakeup time by the timer is determined using predetermined data.

11. The method of claim 6, further comprising receiving information related to the paging period.

12. A method for a mobile terminal to reduce power consumption, the method comprising:
- receiving information related to a paging period;
- evaluating a predetermined condition based on a predetermined data; and
- outputting a signal to change a wakeup state of the mobile terminal if the predetermined condition is met, wherein changing the wake up state comprises setting a time set by a timer of the mobile terminal to coincide with a multiple of the paging period when the predetermined condition is met,
- wherein a frequency of wake up by the timer and a frequency of wake up by paging period is different during a predetermined interval.

13. The method of claim 12, wherein the predetermined condition is met when a difference between multiples of a timer period and the paging period is less than a predetermined threshold value.

14. The method of claim 12, wherein the mobile terminal determines the paging period by determining a Broadcast Control CHannel (BCCH) provided from a network.

* * * * *